United States Patent
Mori et al.

[15] 3,661,446
[45] May 9, 1972

[54] HIGH MAGNIFYING POWER DRY OBJECTIVE MICROSCOPE

[72] Inventors: Ikuo Mori; Keiji Matsuki, both of Kawasaki, Japan

[73] Assignee: Nippon Kogaku K.K., Tokyo, Japan

[22] Filed: Sept. 2, 1970

[21] Appl. No.: 68,898

[30] Foreign Application Priority Data

Sept. 6, 1969 Japan..................................44/70313

[52] U.S. Cl. .......................350/214, 350/175 ML, 350/177
[51] Int. Cl. ......................................................G02b 21/02
[58] Field of Search............................350/214, 175 ML, 177

[56] References Cited

UNITED STATES PATENTS 3,380,793  4/1968  Klein.......................350/175 ML UX
3,540,798  11/1970  Kobaya.....................350/214 X Primary Examiner—John K. Corbin
Attorney—Harry G. Shapiro

[57] ABSTRACT

A high magnifying power dry objective for a microscope capable of a magnifying power of 100×, numerical aperture of 0.9 and working distance 1.9f, where f is the compound focal length of the objective, and which consists of 10 elements in seven groups. The first lens is a positive meniscus whose concave surface faces toward a specimen so that the light rays from the object point on the optical axis traverses through the rear lenses to be refracted suitably, and the optical aberrations are well corrected.

1 Claim, 4 Drawing Figures

PATENTED MAY 9 1972  3,661,446
FIG. 1
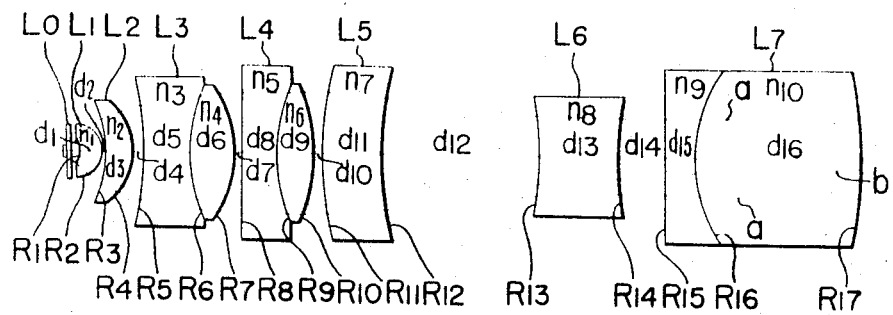
FRONT LENS SYSTEM COVERGLASS
REAR LENS SYSTEM
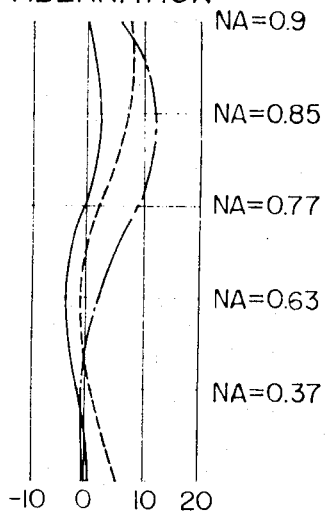
SPHERICAL ABERRATION
FIG. 2(A)
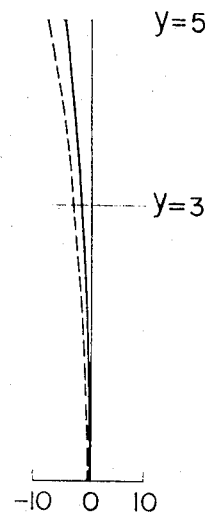
ASTIGMATISM
FIG. 2(B)
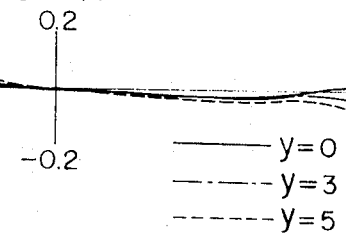
COMA
FIG. 2(C)
INVENTORS
IKUO MORI
AND
KEIJI MATSUKI
BY Harry G. Shapiro
ATTORNEY

HIGH MAGNIFYING POWER DRY OBJECTIVE MICROSCOPE

BACKGROUND OF THE INVENTION

The present invention relates to a high magnifying power dry objective for microscopes.

In general, the high magnifying power objective for microscopes employ oil immersion lens systems in order to improve the optical characteristics. However, for biological investigations, the immersion liquid must be used for each observation, which is very inconvenient. Furthermore, the specimen tends to become colored and deformed by the immersion liquid. The use of dry objectives may of course overcome this problem. However, the higher the magnifying power, the shorter the focal length and the greater the value of sine $\theta$ which determines the numerical aperture NA. Therefore, when the space between the cover glass and the front lens of the dry objective with NA=0.9 and 100× is filled with a most common immersion oil such as cedar oil having a refractive index of 1.515, the numerical aperture NA becomes 1.36 because NA=$n \sin \theta$. The oil immersion objective with 100× is generally used with a numerical aperture from 1.25 to 1.30. To attain this numerical aperture range by dry objectives, the value of sine $\theta$ must be increased considerably, and it is extremely difficult to employ such a high sine $\theta$ with a predetermined tube length.

SUMMARY OF THE INVENTION

It is therefore the primary object of the present invention to provide a dry objective for microscopes with 100×, NA=0.9, and working distance of $\approx 0.19f$ having well balanced optical aberrations.

BRIEF DESCRIPTION OF THE DRAWINGS

The accompanying drawings concern one embodiment of the present invention in which:

FIG. 1 is a sectional view of the optical system of the objective in accordance with the present invention; and FIGS. 2(A), (B) and (C) are optical aberration diagrams of the objective.

DESCRIPTION OF THE PREFERRED EMBODIMENT

Referring to FIG. 1, the front positive lens system consists of two positive meniscus lenses $L_1$ and $L_2$ whose concave surfaces are for direction toward a specimen and two cemented positive meniscus or positive lens groups $L_3$ and $L_4$. The rear negative lens system consists of a positive meniscus lens $L_5$ whose convex surface is for direction toward the specimen, a negative (biconcave) lens $L_6$ and a cemented positive lens group $L_7$. The objective consisting of the above-mentioned front positive and rear negative lens systems satisfies the following conditions:

$$1.5f > |R_1| > 0.5f \quad (1)$$
$$R_{16} < |R_{17}| \quad (2)$$
$$n_9 > n_{10} \quad (3)$$

where
$f$ = the compound focal length of the objective;
$R$ = the radius of curvature of a surface of a lens identified by a numerical subscript; and
$n$ = the refractive index of a lens identified by a numerical subscript.

To provide a dry and high magnifying power lens, the most important and critical problem is how to image an object point on the axis within a predetermined tube length in the best condition. For this purpose the light rays emitted from the object point on the optical axis must pass through the lenses so as to be refracted by each lens as desired. This is more important than the correction of aberrations. For example, in case of an oil-immersion lens system, there is only a small difference between the refractive indices of the oil and the first lens so that the light rays are almost not refracted by the surface with the radius of curvature $R_1$. On the other hand in case of a dry lens system, if the surface with $R_1$ is plane (in case of the oil-immersed lens systems, almost all of the front surfaces are plane) the light rays from the object point on the axis are refracted by the surface $$R_1 \text{ by } \left(\theta - \sin^{-1} \frac{\sin \theta}{n}\right)$$

since the front surface of the first lens is in contact with the air. Thus the light rays from the object point on the axis directed toward the most rear surface of the lens system cross the optical axis within the lens or pass a point very close to the optical axis. This is of course applied only when the object is imaged within the predetermined tube length. Even when the aberrations are corrected under this condition, the corrections are not effective because the rays from the object point on the axis pass very close to the axis of the rear lenses. From the foregoing, it is seen that the radius of curvature of the first lens $R_1$ is the most important factor in design of a high magnifying power dry objective. For this reason, the difference between the angles of incidence and refraction of the rays from the object point on the axis is made as small as possible so as to give a negative radius of curvature. In this case, from the foregoing consideration it is suitable and preferable that the focal length $f_1$ of the first lens satisfies the following condition;

$$2f > f_1 > f.$$

In the instant embodiment, the angles of incidence and refraction of the light rays from the object on the axis $\theta$ and $\theta'$ are 64° and 47° respectively. When the first lens $L_1$ is composed so that the light rays from the object point on the axis are made to pass through the rear lenses as mentioned above, usual means of correction for the spherical aberration may be adopted for the rear lens group, but the coma of the light rays below the center line of the oblique light ray bundle (to be referred to as "lower oblique light rays") is increased to the negative side because of the aforementioned condition (1). To overcome this problem, the rearmost lens group $L_7$ is so designed as to satisfy the conditions (2) and (3). It is not desired for the correction of coma of the lower oblique light rays to make the incident light rays impinge upon the convex surface of the lens which also functions so as to diverge the rays. Generally, it is more effective to make the incident rays impinge upon the concave surface, but in the case of a microscope lens the so-called picture angle is very small compared with that of a photographic lens so that the correction is not so effective because of the variation of the spherical aberration. It is more advantageous to employ even a negative or diverging surface so that the point at which the rays are incident from the object-point on the axis differs widely differed from the point of incidence of the lower oblique light rays. In other words, the surface is such that the variation of spherical aberration differs substantially from that of coma. According to the present invention, therefore, the seventh lens group $L_7$ is made up of the cemented lenses so that the negative cemented surface may serve to correct the negative coma of the lower oblique light rays.

Since the $R_1$ is a small negative radius of curvature, the working distance (W.D.) will become shorter by $$(R_1 - \sqrt{R_1^2 - h_1^2})$$

compared with that when $R_1 = \infty$, where $h_1$ = effective radius of the surface $R_1$. In the lens system in accordance with the present invention, the working distance is so designed as to become longer, but if it is too long, it is undesirable for the correction of the aberrations so that the working distance is of the order of $0.2f$ at the most in consideration of the magnifying power. For this purpose, the compound focal length $f\Delta$ of the front lens system $L_1\Delta L_4$ is suitably given as to satisfy the following condition:

$$2f > f\Delta > f$$

FIG. 1 illustrates one embodiment of a high magnifying power dry objective embodying the present invention based upon the above design considerations. In FIG. 1, (a) designates the spherical light bundles; and (b) the lower oblique light rays at $y = 10$. When the focal length = 1.7, the magnifying power $\beta$ = 100×, the numerical aperture N.A. =

0.9 and a cover glass $L_0$ 0.17 mm in thickness is disposed in front of the first lens $L_1$, the design data being as follows:

| | | | |
|---|---|---|---|
| $R_0'=\infty$ | $d_0'=0.17$ | $n_0=1.52334$ | cover glass |
| $R_0=\infty$ | $d_0=0.22$ | | |
| $R_1=-1.1$ | $d_1=0.9$ | $n_1=1.56384$ | $\nu d_1=60.8$ |
| $R_2=-0.85$ | $d_2=0.02$ | | |
| $R_3=-6.25$ | $d_3=1.05$ | $n_2=1.56384$ | $\nu d_2=60.8$ |
| $R_4=-2.15$ | $d_4=0.42$ | | |
| $R_5=-15.0$ | $d_5=1.6$ | $n_3=1.6727$ | $\nu d_3=32.2$ |
| $R_6=4.82$ | $d_6=1.72$ | $n_4=1.51728$ | $\nu d_4=69.6$ |
| $R_7=-3.55$ | $d_7=0.1$ | | |
| $R_8=150.0$ | $d_8=1.24$ | $n_5=1.77551$ | $\nu d_5=37.9$ |
| $R_9=4.82$ | $d_9=1.5$ | $n_6=1.43386$ | $\nu d_6=94.9$ |
| $R_{10}=-5.15$ | $d_{10}=0.1$ | | |
| $R_{11}=10.0$ | $d_{11}=2.3$ | $n_7=1.7552$ | $\nu d_7=27.5$ |
| $R_{12}=15.0$ | $d_{12}=5.5$ | | |
| $R_{13}=-22.0$ | $d_{13}=3.0$ | $n_8=1.6968$ | $\nu d_8=55.6$ |
| $R_{14}=22.0$ | $d_{14}=1.5$ | | |
| $R_{15}=118.0$ | $d_{15}=1.0$ | $n_9=1.72$ | $\nu d_9=50.3$ |
| $R_{16}=4.9$ | $d_{16}=6.0$ | | |
| $R_{17}=-32.767$ | | $n_{10}=1.62012$ | $\nu d_{10}=49.8$ |
| $f_1=2.88$ | $f\Delta=2.44$ | distance in image space $=154.74$ | | where
R indicates the radius of curvature, the surfaces being numbered from front to rear;
d indicates the thickness of a lens or distance of air space along the axis;
n indicates the refractive index of a lens; and $\nu d$ indicates the Abbe's number of the glass of a lens.

FIGS. 2(A), (B) and (C) show the aberration diagrams of the objective shown in FIG. 1, (A) illustrating the spherical aberration; (B), the astigmatism; and (C), the coma. The objective shown in FIG. 1 has a magnification power $\beta = 100-$, N.A. $= 0.9$, and working distance WD $\geq 0.19f$. The optical aberrations are well balanced.

What is claimed is:

1. A high magnifying power dry objective for microscopes comprising a first and second group ($L_1$, $L_2$) each consisting of a positive meniscus lens, a third group ($L_3$) consisting of two lenses cemented to provide a positive lens group, a fourth group ($L_4$) consisting of two lenses cemented to provide a positive lens group, a fifth group ($L_5$) consisting of a positive meniscus lens, a sixth group ($L_6$) consisting of a negative lens, and a seventh group ($L_7$) consisting of two lenses cemented to provide a positive lens group, said objective having the following numerical data:

| | | $d_0'=0.17$ | $n_0=1.52334$ | Cover glass |
|---|---|---|---|---|
| | $R_0'=$ $R_0=$ | | | |
| $L_1$ | $\{R_1=-1.1$ | $d'=0.9$ | $n_1=1.56384$ | $\nu d_1=60.8$ |
| | $\{R_2=-0.85$ | $d_2=0.02$ | | |
| $L_2$ | $\{R_3=-6.25$ | $d_3=1.05$ | $n_2=1.56384$ | $\nu d_2=60.8$ |
| | $\{R_4=2.15$ | $d_4=0.42$ | | |
| $L_3$ | $\{R_5=-15.0$ | $d_5=1.6$ | $n_3=1.6727$ | $\nu d_3=32.2$ |
| | $\{R_6=4.82$ | $d_6=1.72$ | $n_4=1.51728$ | $\nu d_4=69.6$ |
| | $\{R_7=-3.55$ | $d_7=0.1$ | | |
| $L_4$ | $\{R_8=150.0$ | $d_8=1.24$ | $n_5=1.77551$ | $\nu d_5=37.9$ |
| | $\{R_9=4.82$ | $d_9=1.5$ | $n_6=1.43386$ | $\nu d_6=94.9$ |
| | $\{R_{10}=5.15$ | $d_{10}=0.1$ | | |
| $L_5$ | $\{R_{11}=10.0$ | $d_{11}=2.3$ | $n_7=1.7552$ | $\nu d_7=27.5$ |
| | $\{R_{12}=15.0$ | $d_{12}=5.5$ | | |
| $L_6$ | $\{R_{13}=-22.0$ | $d_{13}=3.0$ | $n_8=1.6968$ | $\nu d_8=55.6$ |
| | $\{R_{14}=22.0$ | $d_{14}=1.5$ | | |
| $L_7$ | $\{R_{15}=118.0$ | $d_{15}=1.0$ | $n_9=1.72$ | $\nu d_9=50.3$ |
| | $\{R_{16}=4.9$ | $d_{16}=6.0$ | $n_{10}=1.62012$ | $\nu d_{10}=49.8$ |
| | $\{R_{17}=-32.767$ | | | |

NOTE.—$f_1=2.88$. $f\Delta=2.44$ distance in image space $=154.74$.

where
$f$ is the compound focal length of said objective;
B is the magnifying power;
N.A. is the numerical aperture;
R indicates the radius of curvature, the surfaces being numbered from front to rear;
d indicates the thickness of a lens or distance of air space along the axis;
n indicates the refractive index of a lens; and
$\nu d$ indicates the Abbe number of the glass of a lens.

* * * * *